United States Patent Office 3,736,302
Patented May 29, 1973

---

3,736,302
PROCESS FOR POLYMERIZING VINYL COMPOUNDS USING PREMIXED REDOX CATALYST OR NITROUS COMPOUNDS/SULFOXY COMPOUNDS
Yasushi Joh and Teruhiko Sugimori, Otake, Japan, assignors to Mitsubishi Rayon Company Limited, Tokyo, Japan
No Drawing. Filed July 23, 1971, Ser. No. 165,716
Claims priority, application Japan, July 30, 1970, 45/66,769
Int. Cl. C08f 3/76, 7/04, 15/02
U.S. Cl. 260—79.3 MU                5 Claims

ABSTRACT OF THE DISCLOSURE

In an improved process for polymerizing or copolymerizing a vinyl compound, particularly acrylonitrile, in the presence of a redox catalyst combination of either nitrous acid or its salt and a reducing sulfoxy compound, a main feature of which is such that both the catalyst components are previously reacted with each other under a batch system while the pH of the reaction system is maintained within the range of 7.0 to 4.0 or 3.0 to 1.0, or first 7.0 to 4.0 and successively 3.0 to 1.0, and thereafter, the resultant catalyst solution is fed into a polymerization vessel.

Polymers, thus obtained, have advantageous properties suitable for most textile applications.

---

This invention relates to an improved process for the polymerization of vinyl compounds and more particularly, an improved process for the production of an acrylonitrile polymer or copolymer most suitable for textile applications, in which process is employed a redox catalyst of a type comprising a combination of nitrous acid or a salt thereof and a reducing sulfoxy compound.

So-called redox catalyst systems are extensively employed as well as organic initiators such as azobisisobutyronitrile and the like for the production of acrylonitrile polymers, which are used as raw material for acrylic fibers. Among others, a redox catalyst comprising nitrous acid or a salt thereof and a reducing sulfoxy compound is known as a useful catalyst for the polymerization of various vinyl compounds. However, when the combination of nitrous acid or its salt and a reducing sulfoxy compound is applied to the polymerization of acrylonitrile, satisfactory quality of acrylonitrile polymers is not obtainable.

Needless to say, acrylonitrile polymers which are used as raw material for acrylic fibers are required to have many advantageous properties and their quality has great influence on that of fibers produced therefrom, as is also true for other synthetic fibers such as nylon, polyester fiber and the like.

The advantageous properties required in the polymers are as follows: The polymers should exhibit, (a) excellent operationability in various steps in the production of fibers; for example, both rapid feeding of polymers, which depends upon their configuration, and stable and constant feeding thereof at the time of preparing a spinning solution, which depends upon bulk density, shape and size of the polymer particles, should be attainable. That is, fluctuations of the polymer feed rate which are caused by a bridge action exerted in the powdered polymer should not be observed in the preparation process of the spinning solution. They should also exhibit high spinning stability, drawability and other processablity, for example, in a turbo-stapler. Acrylic fibers produced therefrom should also have (b) Excellent yarn quality and spinnability, (c) High whiteness,
(d) Good heat stability,
(e) Good dyeability with no fluctuation in dyeing properties, and
(f) good hand of the final textile goods.

All these requirements mainly depend on the quality of the polymer to be used as raw material.

In order to obtain a polymer which satisfies the above requirements, the catalyst to be employed, polymerization conditions and quality control during the polymerization are of great importance. If any of them is inadequate, a polymer of a satisfactory quality is not obtainable and hence, the desired properties for acrylic fibers cannot be expected even if manufacturing conditions of the fibers are carefully selected during and after spinning.

From the results of extensive research on the preparation of vinyl polymers, especially on a catalyst suitable for use in the preparation of such acrylonitrile polymers which had the above-listed advantageous properties and were suitable for textile applications, it was found that, if an aqueous solution of nitrous acid or a salt thereof and a reducing sulfoxy compound were fed into a polymerization vessel after the two catalyst components were reacted with each other, an extremely increased catalyst activity was obtainable. However, it was also proved that, when the catalyst components were reacted with each other before being fed into a polymerization vessel, it was difficult to secure better controllability of the polymerization because the catalyst activity markedly varied with progress of polymerization. The difficulty constituted an obstacle for putting the method to practical use. Thus, in order to obviate this defect, we previously proposed a method which is characterized in that both catalyst components are continuously reacted with each other under such conditions that a residence time is substantially constant and the pH of the reaction system is within the range of 1.0 to 7.0 and then, the resultant catalyst system is continuously fed into a polymerization vessel during polymerization. The method was filed as our copending U.S. patent application No. 120,686.

In the practice of this method, as a concentration of the catalyst can be checked up by analysis before being fed into a polymerization vessel, a serious difficulty is prevented, which difficulty up to now, has sometimes been caused in the preparation of a catalyst by an operative's slip. The principle of this proposed method however cannot be applied to a method such as the inventional method wherein the catalyst is batchwise prepared and fed into a polymerization vessel; it is difficult to secure better controllability of the polymerization as mentioned above, because an effective catalyst concentration varies with the lapse of reaction time.

However, the method wherein both catalyst components are continuously reacted with each other under such a condition that the residence time is always constant, has the following defect, which is particularly serious in the commercial production of an acrylonitrile polymer or copolymer most suitable for textile fibers. When both catalyst components of nitrous acid or its salt and a reducing sulfoxy compound are mixed with each other, gas is evolved due to the reaction between the components, which gas problem has not been explained, up to now. The gas, when it is fed into a polymerization vessel together with the catalyst solution, results in polymers possessing inferior whiteness. Further, the gas often hinders the constant feeding of the catalyst solution.

Now, from the results of a more extensive research into a method wherein the catalyst is prepared under a batch system in order to obviate the above troubles due to the continuous preparation and secure the benefit of the batch preparation, but without the catalyst activity of the resultant solution varying with the lapse of time, it has been found that, if both catalyst components of either nitrous acid or a salt thereof and a reducing sulfoxy compound are previously, i.e. before being fed into a polymerization vessel, reacted with each other in an aqueous medium under a batch system while the pH of the reaction system is maintained within the range of 7.0 to 4.0 or 3.0 to 1.0, the resultant catalyst activity exhibits a negligible degree of variance with the lapse of time. That is, in a catalyst prepared at a pH ranging from 7.0 to 4.0 or 3.0 to 1.0 as mentioned above, there is no significant difference in catalyst activity between the catalyst solution immediately after the preparation and 10 hours after the time of preparation.

In accordance with the present invention, the catalyst solution prepared by a batch process can be fed into a polymerization vessel, after gas evolved during the preparation is removed therefrom. Therefore, the troubles due to the gas, as mentioned above, are avoided.

Further, the present invention provides another advantage; an effective catalyst component prepared from the above two components in a catalyst reactor, before being fed into a polymerization vessel, can easily be sampled through a mouth of the reactor and checked up by analysis and, if required, precisely rectified for the provision of polymers having the desired qualities most suitable for textile fibers, such as degree of polymerization, composition and the like.

In the practice of the present invention, a reaction between both catalyst components of either nitrous acid or a salt thereof and a reducing sulfoxy compound is carried out under a batch system before the catalyst combination is fed into a polymerization vessel. The reaction should be carried out with a pH of the reaction system being maintained within the range of 7.0 to 4.0 or 3.0 to 1.0. It may also be carried out, first, at a pH range of 7.0 to 4.0 and successively, at a pH range of 3.0 to 1.0 in the same or another catalyst reactor. Regulation of a pH of the reaction system is usually effected by the addition of, for example, an inorganic acid such as sulfuric acid, hydrochloric acid, nitric acid and the like, or an inorganic salt such as sodium carbonate, potassium carbonate, sodium bicarbonate and the like. However, an organic acid and a salt thereof or alkali such as sodium hydroxide and potassium hydroxide may also be used. A reaction temperature and a reaction time are preferably within the ranges of 20 to 60° C. and 5 to 60 minutes, respectively.

A reducing sulfoxy compound, which is used as one component of the redox catalyst combination in this invention, includes, for example, sulfurous acid, sulfites such as sodium sulfite, potassium sulfite and ammonium sulfite, bisulfites such as sodium bisulfite, potassium bisulfite and ammonium bisulfite, and metabisulfites such as sodium metabisulfite and potassium metabisulfite.

Thus, the method of the present invention results in polymers possessing far better quality, as compared with those prepared by a conventional method wherein both catalyst components are separately fed into a polymerization vessel. As compared with the conventional method, the present invention has the beneficial effects as listed below.

(1) The catalytic activity is remarkably enhanced and therefore, the conversion is increased, which results in a great expansion of the productivity and reduction of the amount of the catalyst to be used.

(2) The viscosity of slurry during polymerization is low, which improves the stirring efficiency. Consequently, entirely homogeneous polymers are obtainable.

(3) Further, the low viscosity of slurry makes it possible to raise the concentration of monomer to be fed into a polymerization vessel, which also results in a great expansion of the productivity.

(4) Abnormal polymer adherents are produced only a little on the inner wall of a polymerization vessel and on an agitator during polymerization, which enables a continuous operation for long periods, and resulting polymers are not contaminated with abnormal polymers which are difficult to dissolve in usual solvents.

(5) The product polymers have high solubility in usual solvents for spinning and the resulting spinning solution has good stability.

(6) The polymers are exceedingly superior in heat stability.

(7) The spinning solutions of the polymers have an improved filterability.

(8) Further, filaments manufactured from the polymers are exceedingly superior in spinnability, particularly drawability, to those from polymers prepared in such a manner that the redox catalyst components are separately fed into a polymerization vessel.

Moreover, as compared with a method wherein both catalyst components are continuously reacted with each other in such a manner that a residence time is substantially constant and then, continuously fed into a polymerization vessel during polymerization, as disclosed in our copending U.S. patent application No. 120,686, the present invention has the beneficial effects as listed below.

(1) Inevitable change of the effective catalyst concentration with the lapse of time, which is the dtfect of a conventional method wherein a catalyst is prepared under a batch system before fed into apolymerization vessel, is obviated.

(2) The trouble which arises by gas evolved in a process of the continuous catalyst preparation can be easily avoided in a batchwise catalyst preparation of the present invention. Further, since gas is not fed into a polymerization vessel, the batchwise catalyst preparation results in polymers possessing excellent whiteness and other desirable qualities.

(3) Since gas is not fed into a polymerization vessel, even in the case where a monomer having a lower boiling point is employed as a comonomer in the copolymerization, an amount of the monomer escaping from the reaction system accompanying the gas is markedly reduced, which leads to an increase of the conversion of the monomer.

(4) Since an effective catalyst concentration can be checked up by sampling the catalyst produce from a catalyst reactor at an appropriate time before the catalyst is fed into a polymerization vessel, fluctuation in an amount of the catalyst to be fed into a polymerization vessel, which can be due to a human error or an accident to the pump in the continuous production, can be prevented. Thus, the present invention is decidedly advantageous in quality control for commercial production.

(5) Corrosion in material of a catalyst reactor is greatly mitigated, as compared with that in the continuous preparation.

A process of the present invention may be applied to polymerization and copolymerization of vinyl compounds capable of radical polymerization. These vinyl compounds include, for example, acrylonitrile, styrene, methyl acrylate, methyl methacrylate, butyl acrylate, butyl methacrylate, acrylic acid, methacrylic acid, isoprene, butadiene, vinyl acetate, vinylpyridine, vinylpyrrolidone, acrylamide, vinyl bromide, vinyl chloride, vinylidene chloride, methacrylonitrile and the like.

In particular, the process may be preferably applied to polymerization or copolymerization of acrylonitrile. Suitable as monomers for copolymerization with acrylonitrile are all copolymerizable vinyl compounds which are usually employed in conjunction with acrylonitrile, more especially those which are used for the production of acrylonitrile polymers for spinning of textile fibers, such as vinyl acetate, methyl acrylate, methyl methacrylate, methacrylonitrile and the like. Basic or strong acid (or a salt thereof) group-containing monomers which are employed to impart greater dyeability to the fiber spun, such as sodium vinylbenzene sulfonate, sodium methallyl sulfonate, vinylpyridine and the like, are also examples. Generally, the acrylonitrile copolymers obtainable according to the invention contain at least 50% by weight of acrylonitrile.

The invention is further disclosed in the following examples, which are illustrative mainly of polymerization and copolymerization of acrylonitrile but not limited thereto. All "parts" and "%" indicate "parts by weight" and "% by weight, respectively, unless otherwise specified.

CONTROL EXAMPLE 1

A monomeric mixture of 94 parts of acrylonitirle and 6 parts of methyl acrylate, sodium nitrite solution, sodium metabisulfite solution and sodium methallyl sulfonate solution were separately fed into a 10 l. glass vessel, designed for continuous polymerization, to cause polymerization.

A sulfuric acid solution was added into the vessel so as to adjust the pH of the polymerization system to 2.5. The polymerization temperature was 55° C. The amount of sodium methallyl sulfonate used was 0.5%, and those of sodium nitrite and sodium metabisulfite both used as catalysts were 0.5% and 7%, respectively, all these percentages being based upon the total weight of the monomers. The weight ratio of water to the monomers was 7/1 in the steady state.

During the polymerization, the viscosity of the polymer-monomer-water slurry was quite high and hence some difficulties were encountered in the operation of uniformly stirring the slurry. The conversion was 52% at the average residence time of 160 minutes.

In order to determine the degree of polymerization of the polymer, thus obtained, a viscosity measurement was made at a temperature of 30° C. in dimethylformamide (hereinafter referred to as DMF for brevity) showing that the reduced viscosity was 1.78 at C.=0.2.

Disjointing of the polymerization vessel after a continuous operation for a week proved that large quantities of hard polymers adhered to the inner wall thereof. A polymer mass, thus produced, also proved to contain coarse and hard polymer particles. Polymer particles were not uniform in shape at all.

Further, the polymer mass was apt to exert a bridge action between the polymer particles at feeding, resulting in frequent fluctuations in the polymer feeding rate at the time of the preparation of a spinning solution therefrom, which caused some troubles in operation.

Finally, filaments were spun by a normal dry spinning procedure from a dimethylformamide solution containing 29% of the polymer. Spinning conditions were as follows; temperature of the spinning solution, 120° C.; spinning speed, 300 m./min; hot air streams were supplied in parallel to the extruded filaments at a speed of 0.6 m./min.

The resultant filaments were then drawn in a water bath at a temperature of 100° C., which proved that the filaments were greatly inferior in drawability, that is, when they were drawn to approximately three times their original length, filament breakage and fluffing occurred to a great extent and it was consequently impossible to obtain satisfactory filaments.

CONTROL EXAMPLE 2

Acrylonitrile, sodium nitrite solution, sodium bisulfite solution and sulfuric acid solution were separately fed into a 10 l. glass vessel designed for continuous polymerization to cause polymerization. The polymerization temperature was 55° C. and pH was 2.3. The weight ratio of water to the monomer was 9/1. The amounts of sodium nitrite and sodium bisulfite were 0.5% and 5.3%, respectively, based on the total weight of the monomer.

The conversion was 55% under a steady state at the average residence time of 160 minutes.

The resulant polymer slurry proved to be non-homogeneous and contained hard particles. The reduced viscosity of the polymer, except the hard particles, was 2.20 (determined at 25° C. and C.=0.2 in DMF). The standard deviation ($\sigma$) of the viscosity was 0.13, illustrating a considerably large fluctuation of viscosity. The reduced viscosity of the hard particles removed from the polymer slurry was 2.85 (determined in the same manner as the above).

The above abnormal polymer increased in quantity with the polymerization time. That is, the abnormal polymers like hard stones having diameters of 5 to 15 mm. were produced on the bottom of the polymerization vessel. Moreover, abnormal polymers were produced both on the inner wall of the polymerization vessel and on the agitator, which made it impossible to carry on continuous operation for a long period.

Polyacrylonitrile, thus obtained, was dissolved in dimethylformamide to prepare a spinning solution containing 24% of the polymer. When the filaments were spun from the spinning solution under the same conditions as those of Control Example 1, they proved to be poor in spinnability; filament breakage at spinning occurred frequently. Undrawn filaments, thus obtained, also proved to be inferior in drawability, that is, when they were drawn in a boiling water bath, the maximum draw ratio was only five times their original length.

CONTROL EXAMPLE 3

A monomeric mixture of 93.5% acrylonitrile, 6% methyl acrylate and 0.5% sodium methallyl sulfonate was continuously polymerized in a 10 l. glass vessel designed for continuous polymerization. The polymerization temperature was 55° C. A sulfuric acid solution was fed into the vessel to adjust the pH of the polymerization system to 2.5. The weight ratio of water to the monomeric mixture was 9/1.

As catalysts, sodium nitrite and sodium bisulfite were used at the amounts of 0.5% and 7%, respectively, based on the weight of the monomeric mixture. They were not separately fed into the polymerization vessel, but were previously reacted with each other at a temperature of 30° C. for 30 minutes under a batch system in a reactor. The reaction mixture in the reactor was adjusted to a pH of 3.9 by adding a sulfuric acid solution thereto. The catalyst solution, thus prepared, was reserved in a feed tank, from which the solution was fed into the polymerization vessel. In the feed tank, the catalyst solution was maintained at a temperature of 20° C., and remained there for the period ranging from 0 to 8 hours.

Polymerization conditions were the same as those of Control Example 1 except that the catalyst solution previously prepared by reacting the two components with each other in the catalyst reactor, was used. However, the entire aspect of the polymerization differed from that of Control Example 1; the viscosity of the slurry was low and hence, it was easy to stir uniformly. Polymer particles in the slurry were homogeneous. The conversion was 65% at the average residence time of 160 minutes, which conversion was extremely high as compared with that of Control Example 1.

The average reduced viscosity of the resulting polymer was 1.65 at C.=0.2. The production of abnormal polymers and the polymer adhesion to the inner wall of the vessel was barely noticeable throughout the polymerization. It was slight even after a long period of operation, assuring a stable operation.

Further, the polymer mass exerted scarcely any bridge action between the polymer particles and exhibited a reduced fluctuation of feeding rate in the preparation of a spinning solution therefrom.

When filaments were spun from a spinning solution containing 29% of the polymer in dimethylformamide under the same conditions as those of Control Example 1, there were produced undrawn filaments having exceedingly high drawability, which were capable of being drawn to 8.5 times their original length without breakage. The filaments were also superior in whiteness.

It was, however, extremely difficult to control the polymerization degree of the product; the standard deviation ($\sigma$) was 0.12 ($n=33$) for the average reduced viscosity of 1.65, which was accompanied by fluctuation in the amount of the strong acid group introduced into the polymer molecule, resulting in remarkedly uneven dyeing.

CONTROL EXAMPLE 4

Acrylonitrile was copolymerized in the same manner as that of Control Example 3 except that the preparation of the catalyst system was carried out as follows: Sodium nitrite and sodium bisulfite were fed into a catalyst reactor, followed by agitation at a temperature of 30° C. for 10 minutes with the pH of the reaction mixture being adjusted to 3.4 by adding a sulfuric acid solution. The catalyst solution, prepared batchwise, was reserved at a temperature exceeding 5° C. in a feed tank, from which the solution was fed into the polymerization vessel over a period of 10 hours.

The conversion was 63%, which was almost the same as that of Control Example 3. It was, however, extremely difficult to control the polymerization degree of the product; the standard deviation ($\sigma$) was 0.21 ($n=45$) for the average reduced viscosity of 1.68, which was accompanied by fluctuation in the amount of the strong acid group introduced into the polymer molecule, resulting in remarkably uneven dyeing.

EXAMPLE 1

Procedures as mentioned in Control Example 3 were repeated wherein the catalyst was prepared at a pH of 5.8 in place of 3.9 with all other conditions remaining substantially the same. That is, both catalyst components were reacted with each other at a temperature of 30° C. for 30 minutes with the pH of the reaction system being adjusted to 5.8 by the addition of a sulfuric acid solution. The catalyst solution, prepared batchwise, was reserved at a temperature below 20° C. Though the entire aspect of polymerization was similar to that of Control Example 3, it was extremely easy to control the polymerization and the polymerization degree of the product was very stable. That is, the standard deviation ($\sigma$) was 0.021 ($n=80$) for the average reduced viscosity, determined at 25° C. and C.=0.2 in DMF, of 1.65.

Knitted fabrics of the fibers spun from the polymer by a normal procedure did not exhibit uneven dyeing in the least.

EXAMPLE 2

Acrylonitrile was polymerized by the same procedures as those of Control Example 2 except that the catalyst employed was prepared as follows:

The entire amount of sodium nitrite to be employed and half the amount of sodium bisulfite were reacted with each other at a temperature of 55° C. for 20 minutes with the pH of the mixture being adjusted to 6.0 by adding a sulfuric acid solution. The catalyst solution was reserved in a feed tank with the temperature being reduced to 10° C., and fed into a polymerization vessel over a period of 8 hours. The remaining half of the sodium bisulfite was separately fed into the polymerization vessel.

The conversion was 66%, which is extremely high as compared with the 55% conversion of Control Example 2 wherein the redox catalyst components were separately fed into the polymerization system. The polymer, thus obtained, was homogeneous and had a reduced viscosity of 2.12 with the standard deviation ($\sigma$) of 0.019.

Abnormal polymer particles like hard stones were not produced at all and adhesion of polymer to the inner wall of the polymerization vessel and to the agitator was barely noticeable, which made it possible to carry on a stable operation for a long period of time. When filaments were spun from the polymer by a dry spinning procedure under the same conditions as those of Control Example 2, both spinnability and drawability proved to be remarkably high; the maximum draw ratio was 8.5.

EXAMPLE 3

Acrylonitrile was copolymerized by the same procedures as those of Control Example 3 except that the catalyst was prepared as follows: The reaction conditions in a catalyst reactor involved a temperature of 55° C., a residence time of 10 minutes and a pH of 2.5. The catalyst solution, thus prepared, was reserved in a feed tank with the temperature being reduced to 20° C., from which tank the solution was fed into a polymerization vessel.

The conversion was 79% at the average residence time of 160 minutes. The reduced viscosity was 1.59 at C.=0.2 with the standard deviation ($\sigma$) of 0.012. The copolymer proved to have improved homogeneity, excellent whiteness and good heat stability. When filaments were spun by a conventional wet spinning procedure from a spinning solution containing 23.5% of the copolymer in dimethylacetamide, extremely high spinnability and the maximum draw ratio of 9.2 were observed.

For a purpose of comparison, filaments were spun from the copolymer prepared in Control Example 1 in quite the same manner as that described above, resulting in worse spinnability and the maximum draw ratio of only 5 times.

EXAMPLE 4

Procedures as mentioned in Control Example 3 were repeated except that the catalyst was prepared as follows: Both sodium nitrite solution and sulfurous acid solution were previously fed into a catalyst reactor, followed by the addition of a sodium bicarbonate solution to adjust the pH of the reaction mixture to 2.5. Then, the mixture was stirred at a temperature of 45° C. for 15 minutes. The resultant catalyst solution was reserved in a feed tank with the temperature being maintained at 10° C., from which tank the solution was fed into a polymerization vessel over a period of 8 hours.

The conversion was 75%. The reduced viscosity was 1.56 with the standard deviation ($\sigma$) of 0.011 and a stable and continuous operation could be carried out for a prolonged period without any noticeable troubles. Whereas, in the case where the pH in the catalyst reactor was adjusted to 3.5, the conversion was 70% and the reduced viscosity was 1.62 with the standard deviation of 0.18, it was difficult to control the polymerization, particularly the degree of polymerization and accordingly, some troubles were encountered.

The resultant copolymer of the invention proved to be homogeneous and have excellent whiteness and heat stabiltiy. When filaments were wet-spun from the copolymer in the same manner as that of Example 3, extremely high spinnability and a maximum draw ratio of 10.5 were observed.

EXAMPLE 5

A monomeric mixture of 93% acrylonitrile, 6.5% vinyl acetate and 0.5% sodium methallyl sulfonate was continuously polymerized in a 10 l. glass vessel designed for continuous polymerization. The polymerization temperature was 55° C. A sulfuric acid solution was fed into the vessel to adjust the pH of the polymerization system to 2.7. The weight ratio of water to the monomeric mixture was 3/1.

As catalysts, sodium nitrite and sodium bisulfite were used at the amounts of 0.5% and 8%, respectively, based on the weight of the monomeric mixture. They were previously reacted with each other batchwise at a temperature of 30° C. for 30 minutes with the pH of the reaction system being adjusted to 5.5 and then, reacted at a temperature of 30° C. for 20 minutes with the pH being reduced to 2.5 by adding a sulfuric acid solution. Immediately after the reaction, the resultant solution was cooled to 15° C. and then, fed into the polymerization system over a period of 10 hours.

There was no problem with the control of the polymerization. The conversion was 74% and the reduced viscosity was 1.56 with the standard deviation ($\sigma$) of 0.010 ($n=46$). When filaments were spun from this polymer, drawability proved to be very high. Textile goods manufactured therefrom were superior in level-dyeing property.

EXAMPLE 6

Emulsion polymerizations of styrene were carried out wherein catalysts were prepared under the conditions as mentioned in Control Example 1 and Example 1, respectively. The polymerization temperature was 60° C. The pH of the polymerization system was 2.2. As an emulsifier, Emal F (anionic surface active agent made by KAO SEKKEN K. K., Japan) was used at the amount of 2% based on the weight of styrene. A concentration of the monomer in the polymerization system was 10%.

In accordance with the polymerization under the conditions as mentioned in Control Example 1, the conversion was 82% at the residence time of 30 minutes and the reduced viscosity (at 30° C. and C.=0.1 in toluene) was 9.52 with the standard deviation ($\sigma$) of 0.11 ($n=28$). Whereas, in accordance with the polymerization under the conditions as mentioned in Example 1, the conversion was 96% at the residence time of 30 minutes and the reduced viscosity was 9.40 with the standard deviation of 0.009 ($n=28$), showing that the method is quite satisfactory in the control of polymerization.

What is claimed is:

1. A process for polymerizing a vinyl compound wherein a combination of either about 0.5% nitrous acid or a salt thereof and about 2.7 to 8% reducing sulfoxy compound, based on the weight of monomer, is employed as a catalyst, characterized by previously reacting both the catalyst components with each other under a batch system while the pH of the reaction system is maintained within the range of 7.0 to 4.0 or 3.0 to 1.0 and thereafter, feeding the resultant catalyst system into a polymerization vessel.

2. A process for polymerizing a vinyl compound wherein a combination of either about 0.5% nitrous acid or a salt thereof and about 2.7 to 8% reducing sulfoxy compound, based on the weight of monomer, is employed as a catalyst, characterized by previously reacting both the catalyst components with each other under a batch system while the pH of the reaction system is maintained within the range of first 7.0 to 4.0 and successively 3.0 to 1.0 and thereafter, feeding the resultant catalyst system into a polymerization vessel.

3. A process as claimed in claim 1, wherein said both catalyst components are reacted with each other at a temperature of 20 to 60° C.

4. A process as claimed in claim 1, wherein said polymerization is carried out at a temperature of 40 to 60° C.

5. A process as claimed in claim 1, wherein said polymerization is carried out with the pH of the polymerization system being within the range of 1.0 to 3.0.

References Cited

UNITED STATES PATENTS

| | | | |
|---|---|---|---|
| 3,213,069 | 10/1965 | Rausch | 260—79.7 |
| 3,252,951 | 5/1966 | Süling | 260—85.5 |
| 3,388,189 | 6/1968 | Mazzolini | 260—895 |
| 3,410,941 | 11/1968 | Dagon | 264—182 |
| 3,505,290 | 4/1970 | Mazzolini | 260—63 |

JOSEPH L. SCHOFER, Primary Examiner

C. A. HENDERSON, JR, Assistant Examiner

U.S. Cl. X.R.

260—80 M, 85.5 D, 85.5 ES, 88.3 R, 88.3 L, 88.7 D, 89.1 R, 89.5 AW, 89.7 R, 91.7, 92.8 W, 93.5 W, 94.4; 264—178